United States Patent
Gross

(10) Patent No.: US 8,433,825 B2
(45) Date of Patent: Apr. 30, 2013

(54) OPERATING DEVICE FOR EXCHANGING DATA WITH A PROCESS DEVICE IN AN AUTOMATION SYSTEM

(75) Inventor: Stefan Gross, Dettenheim (DE)

(73) Assignee: Siemens Aktiengesellschaft, München (DE)

( * ) Notice: Subject to any disclaimer, the term of this patent is extended or adjusted under 35 U.S.C. 154(b) by 107 days.

(21) Appl. No.: 12/227,275

(22) PCT Filed: May 10, 2007

(86) PCT No.: PCT/EP2007/054511
§ 371 (c)(1),
(2), (4) Date: Nov. 10, 2008

(87) PCT Pub. No.: WO2007/128836
PCT Pub. Date: Nov. 15, 2007

(65) Prior Publication Data
US 2009/0254678 A1    Oct. 8, 2009

(30) Foreign Application Priority Data
May 10, 2006 (DE) .......................... 10 2006 021 767

(51) Int. Cl.
*G06F 15/16* (2006.01)
(52) U.S. Cl.
USPC ........................ 709/248; 709/318; 713/300
(58) Field of Classification Search .................. 709/318, 709/248; 713/300
See application file for complete search history.

(56) References Cited

U.S. PATENT DOCUMENTS

| 5,161,115 A | 11/1992 | Teshima et al. |
| 6,289,252 B1 | 9/2001 | Wilson et al. |
| 6,795,927 B1 * | 9/2004 | Altmejd et al. ............... 713/300 |
| 2002/0006178 A1 * | 1/2002 | Takagi ........................... 375/376 |
| 2003/0005175 A1 * | 1/2003 | Brocco et al. ................. 709/318 |
| 2003/0093607 A1 * | 5/2003 | Main et al. .................... 710/306 |
| 2004/0010347 A1 * | 1/2004 | Yamanashi et al. ........... 700/276 |
| 2004/0124247 A1 * | 7/2004 | Watters ......................... 235/492 |
| 2005/0246560 A1 * | 11/2005 | Oshins et al. ................. 713/300 |
| 2006/0026198 A1 * | 2/2006 | Emery et al. .............. 707/103 R |
| 2006/0059478 A1 * | 3/2006 | Krajewski et al. ............ 717/168 |
| 2006/0184280 A1 * | 8/2006 | Oddsson et al. .............. 700/245 |
| 2009/0050212 A1 * | 2/2009 | Dourdeville et al. ........... 137/14 |

FOREIGN PATENT DOCUMENTS

| DE | 199 40 078 A1 | 3/2000 |
| DE | 10148752 A1 | 4/2003 |
| DE | 102 23 966 A1 | 12/2003 |

OTHER PUBLICATIONS

Kerner, "Rechnernetze nach OSI", 1992, pp. 36-38; ISBN 3-89319-408-8, Addison-Wesley Publishing Company, Germany.

* cited by examiner

*Primary Examiner* — Thuong Nguyen

(57) ABSTRACT

An operator panel having a state unit is provided, wherein individual states of the state unit correspond to states of a state machine contained in a field device and which are synchronized by the state machine in such a way that the actual state of the operator panel corresponds to the actual state of the field device. The operator panel is in the same state as the field device such that the operator panel knows the actual state of the field device.

13 Claims, 1 Drawing Sheet

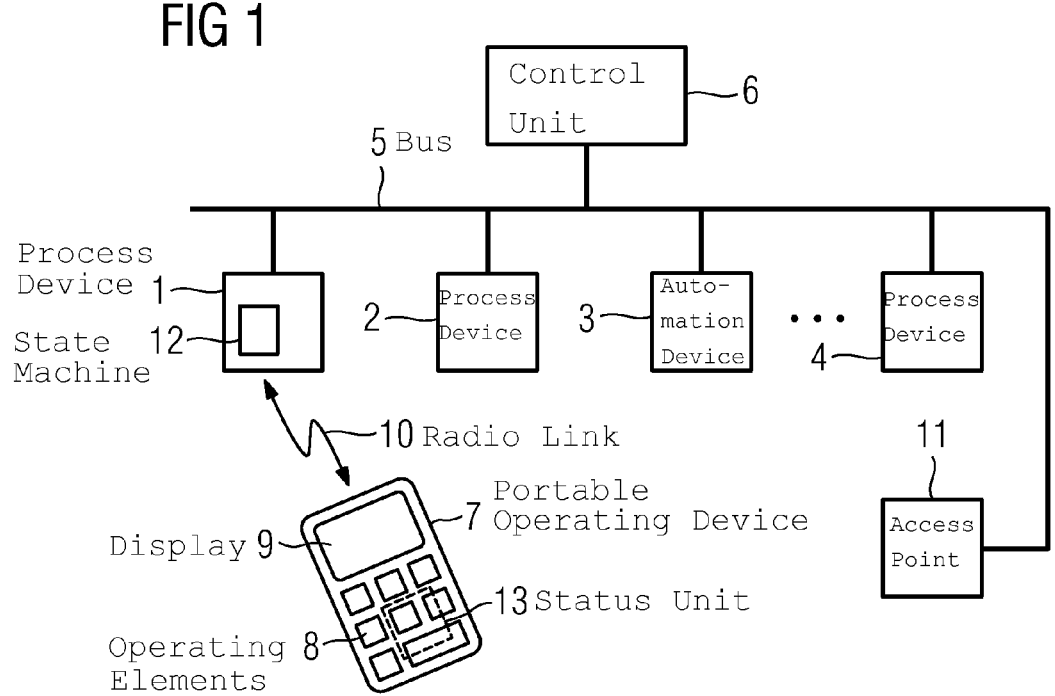
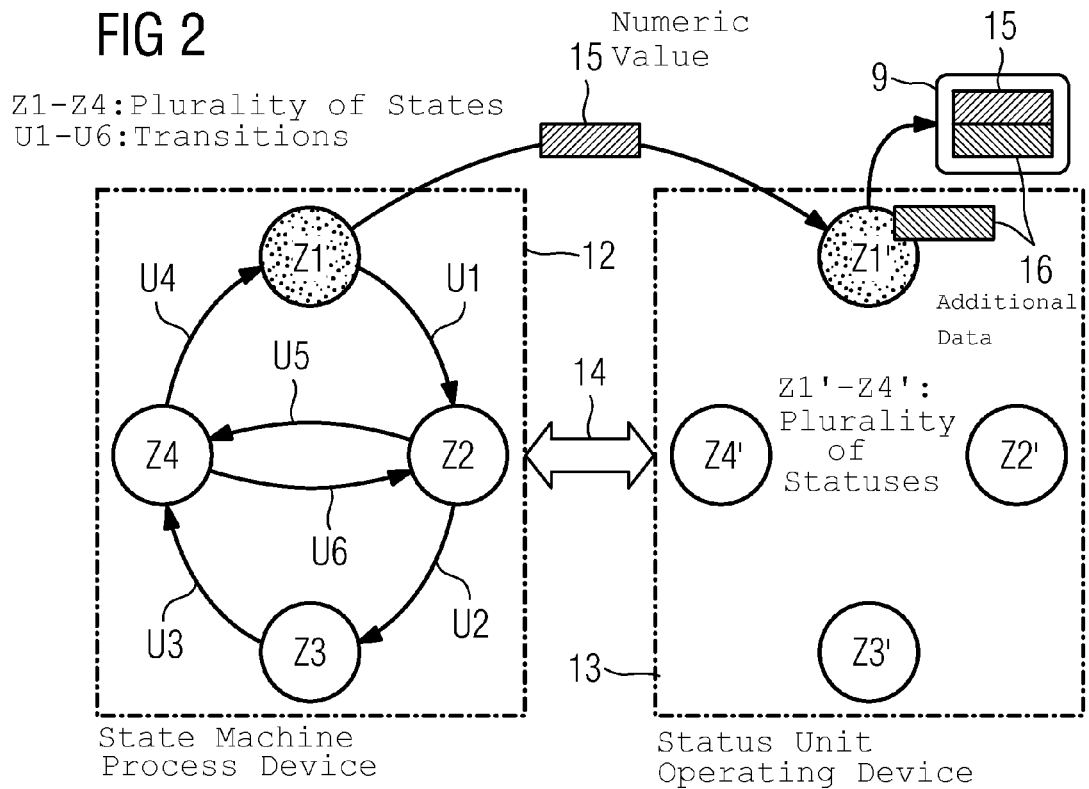

OPERATING DEVICE FOR EXCHANGING DATA WITH A PROCESS DEVICE IN AN AUTOMATION SYSTEM

CROSS REFERENCE TO RELATED APPLICATIONS

This application is the US National Stage of International Application No. PCT/EP2007/054511 filed May 10, 2007 and claims the benefit thereof. The International Application claims the benefits of German application No. 10 2006 021 767.5 DE filed May 10, 2006. Both of the applications are incorporated by reference herein in their entirety.

FIELD OF INVENTION

The invention relates to an operating device for exchanging data with a field device in an automation system.

BACKGROUND OF INVENTION

In automation systems for engineering or industrial plants, e.g. in the process industry, production and manufacturing industry, building services technology or network technology, locally distributed, decentralized field devices (process devices) perform prescribed functions in the plants concerned, as part of the plant automation, and in doing so exchange process, plant and/or device-related data, between one another when necessary but always with higher-level components of the automation system, in particular its management or engineering system. Field devices include, among other things, transducers for pressure, temperature, flow volume, occupancy level etc., analytical devices for gas or fluid analysis, weighing systems, setting drives, position regulators for valves, other local regulators, and frequency converters for electromotive drives. For the purpose of exchanging data within the automation system, the field devices in the local peripheral area, together with any local controller and regulator, operating and monitoring facilities, are linked with each other via field buses or other communication paths, wherein different field buses are linked with each other via bus couplers. The field buses can in turn be linked via control devices, such as for example programmable logic controllers, into a central plant bus to which is also connected the management or engineering system, that is the central controller, regulator, operating and monitoring facilities.

Field devices generally have adjustable device parameters such as for example limit values for alarms or warnings, calibration curves, parameters in evaluation algorithms for signal processing etc. The device parameters can be set and modified in different ways depending on the device type and manufacturer, e.g. via input facilities such as a keyboard, directly on the field device and/or by means of special software programs which are installed on a host computer and communicate with the field device via the latter's communication interface. To an increasing extent, separate operating devices are used for the local operation of the field device, for example so-called handheld PCs, which preferably communicate with the field device wirelessly. When they are input or modified, the device parameters are visualized by means of the display facilities on the operating device and/or the field device, where the display facilities can generally also be used to display further process, device and plant data, such as for example process values. Using an operating device it is also possible to operate several field devices, including those of different types or from different manufacturers.

SUMMARY OF INVENTION

For a complex exchange of data between the operating device and the field device, if for example there is need to transmit commands and parameters from the operating device to the field device, and responses or acknowledgements together with process measurement values and device data in the reverse direction from the field device to the operating device, often using demanding transmission protocols, a considerable level of additional processor power and energy must be provided in the field device. This is particularly so in the situation, for example, when whole screen contents must be transmitted from the field device to the operating device.

An object of the invention is to reduce the effort required in the exchange of data between the operating device and the field device.

The object is achieved by an operating device, for the exchange of data with a field device in an automation system, whereby the operating device contains a status unit whose individual statuses correspond to the states of a state machine contained in the field device, and which can be synchronized by the state machine in such a way that the current status of the operating device corresponds to the current state of the field device.

Because of the synchronization of the status unit by the state machine, the operating device always adopts the same status as the field device, so that the current state of the field device is known to the operating device. Data items related exclusively to the state therefore no longer need to be exchanged between the two devices, thereby significantly reducing the scope of the data to be exchanged. For example, if the field device is in a state in which pressure measurement values are to be transmitted to the operating device, it is sufficient to transmit purely the numeric values, because the operating device knows that the numeric values it receives are pressure measurement values and not, say, flow volume measurement values or parameter values.

In accordance with an advantageous development of the operating device, the data items exchanged between the operating device and the field device can therefore, in the receiving device concerned, be linked with state-dependent supplementary data available in the device and/or can be subject to further processing. This applies in particular also to the manner in which the data received is to be displayed. So it is no longer necessary to transmit the whole content of a display, but only the values to be displayed, which are then prepared in a way dependent to the state for display by the receiving device, e.g. are displayed in a state-dependent mask generated by the receiving device.

For example, if a particular parameter is to be set in the field device, the latter initially receives from the operating device a command which prompts the state machine in the field device to put itself into a state which is provided for the setting or amendment of parameters. Such a command can be security-oriented, e.g. password protected, in order to prevent the unauthorized amendment of parameters. It is now only necessary to transmit to the field device the type of the parameter and its value, but not a command which implies that a parameter is to be entered or amended. If, in addition, different states are provided for different parameter types, then it also becomes unnecessary to transmit the relevant parameter type, because this is known from the state.

Synchronization of the status unit in the operating device can be effected on a time-dependent basis by the cyclic transmission to the operating device of a code for the current state of the field device.

The synchronization will preferably be effected on an event-controlled basis each time there is a state change in the field device, in that the code for the new state is transmitted to the operating device.

Receipt of the code will preferably be acknowledged by the operating device, whereby if the acknowledgement fails to appear, or if a state is incorrectly acknowledged, the field device retransmits the code for the current state to the operating device.

BRIEF DESCRIPTION OF THE DRAWINGS

For the purpose of further explaining the invention, reference is made in what follows to the figures in the drawing; specifically these show:

FIG. 1 an example of an automation system with field devices and an operating panel.

FIG. 2 diagrammatically, an example of the state machine in one of the field devices and the status unit in the operating device.

DETAILED DESCRIPTION OF INVENTION

FIG. 1 shows an automation system with a field device 1, for example a transducer, which together with other field and automation devices 2, 3 and 4 is linked via a communication bus 5 with a higher level control facility 6. When the automation system is in production mode, user data is exchanged between the components 1 to 4 and 6 via the communication bus 5.

A portable operating device 7 (so-called handheld PC) with operating elements 8 and a display facility 9 is designed for communicating with each one of the field devices 1 to 4 individually via a radio link 10. This communication can take place directly with the field devices 1 to 4 or via an access point 11, which is also connected to the bus 5.

The field devices 1 to 4 can be parameterized via the operating device 7 which, for this purpose, enables parameters for the field devices 1 to 4 to be input, amended and verified and commands to be input, via the operating elements 8 and the display facility 9. Apart from the amendable parameters, it is also possible to display on the display facility 9 process measurement values and other items of data from the automation system, which are transmitted from the field devices 1 to 4 to the operating device 7.

As shown by the example of the field device 1, each of the field devices contains a state machine 12, which monitors the user activities or actions, undertaken via the operating device 7, in terms of their sequence and also the time, automatically activates any write or password protection, prompts the user to confirm settings which have been made, and only accepts productive operation of the field device 1, i.e. the exchange of user data with the other components 2 to 4 and 6 of the automation system, if certain prescribed actions have been completed.

The operating device 7 contains a status unit 13 which is synchronized by, i.e. is reconciled with, the state machine 12 in the field device 1.

As FIG. 2 shows, using a very simplified example, the state machine 12 in the field device 1 has a prescribed number of states Z1 to Z4 with prescribed transitions U1 to U6 between the states Z1 to Z4. The status unit 13 in the operating device 7 has a corresponding number and types of statuses, Z1' to Z4'. As indicated by a double arrow 14, the status unit 13 is synchronized by the state machine 12 in that each time there is a state transition, e.g. U4, in the field device 1 a code for the new state, e.g. Z1, is transmitted via the radio link 10 to the operating device 7, which thereupon acknowledges receipt of the code and adopts the status Z1'.

In the present example, it is assumed that in the state Z1 or status Z1', as applicable, a certain measurement value from the field device 1, e.g. a temperature measurement value, is to be shown in a display mask on the display facility 9 of the operating device 7. Via the radio link 10, a pure measurement value (numeric value) 15 is transmitted to the operating device 7, and there it is combined with additional data 16, such as the display mask and the type of the measured value, in this case a temperature, stored in the operating device 7 or requested by the latter from the automation system via the access point 11, and is put on the display.

State changes in the field device 1 can be initiated by inputs to the field device 1 or the operating device 7, where in the latter case the operating device 7 generates an appropriate command and transmits it to the field device 1.

The invention claimed is:

1. An operating device for an exchange of data with a decentralized process device in an automation system, comprising:
   a status unit having a plurality of states, the status unit being integrated into a portable operating device which communicates with the decentralized process device,
   wherein the plurality of states of the status unit correspond to a plurality of states of a state machine contained in the decentralized process device, wherein the decentralized process device is part of an industrial plant and performs a prescribed function in the industrial plant and is linked via a communication bus to a higher level control unit for exchanging data,
   wherein the plurality of states of the state unit are synchronized by the state machine such that a current state of the portable operating device corresponds to a current state of the decentralized process device,
   wherein, when the portable operating device and the field device are in a same state, data exchange between the portable operating device and the decentralized process device is limited to state-independent data, whereas other state-dependent data, which relate exclusively to the same state of the portable operating device and the decentralized process device, are not exchanged between the operating device and the decentralized process device but are available in the portable operating device or in the decentralized process device, and
   wherein the state-independent data received in the portable operating device or received in the decentralized process device are combined with the state-dependent data available in the portable operating device or the decentralized process device.

2. The operating device as claimed in claim 1, wherein the status unit is synchronized on a timed basis.

3. The operating device as claimed in claim 2, wherein a cyclic transmission of a code for the current state of the decentralized process device is transmitted to the portable operating device.

4. The operating device as claimed in claim 3, wherein the portable operating device acknowledges receipt of the code.

5. The operating device as claimed in claim 1, wherein the status unit is synchronized on an event-controlled basis.

6. The operating device as claimed in claim 5, wherein at each transition of the decentralized process device a code for the current state is transmitted to the portable operating device.

7. The operating device as claimed in claim 6, wherein the portable operating device acknowledges receipt of the code.

8. The operating device as claimed in claim 1, wherein further data items are exchanged between the portable operating device and the decentralized process device, and wherein the further data items received in the portable operating device or in the decentralized process device are combined with the data items related exclusively to the same state of the portable operating device and the decentralized process device.

9. The operating device as claimed in claim 8, wherein the data items related exclusively to the same state of the portable operating device and the decentralized process device include at least one display characteristic for information to be displayed.

10. The operating device as claimed in claim 9, wherein the display characteristic includes a display mask or a screen layout.

11. A system for exchange of data, comprising:
a portable operating device having a status unit with a plurality of states, the status unit being integrated into the portable operating device; and
a decentralized process device having a state machine with a plurality of states, wherein the decentralized process device is part of an industrial plant and performs a prescribed function in the industrial plant is linked via a communication bus to a higher level control unit for exchanging data,
wherein the portable operating device communicates with the decentralized process device,
wherein the plurality of states of the status unit corresponds to the plurality of states of the state machine contained in the decentralized process device,
wherein the plurality of states of the portable operating device is synchronized by the state machine such that a current state of the portable operating device corresponds to a current state of the decentralized process device,
wherein, when the portable operating device and the decentralized process device are in a same state, data exchange between the portable operating device and the decentralized process device is limited to state-independent data, whereas other state-dependent data, which relate exclusively to the same state of the portable operating device and the decentralized process device, are not exchanged between the portable operating device and the decentralized process device but are available in the portable operating device or in the decentralized process device, and
wherein the state-independent data received in the portable operating device or received in the decentralized process device are combined with the state-dependent data available in the portable operating device or the decentralized process device.

12. The system as claimed in claim 11, wherein further data items are exchanged between the portable operating device and the decentralized process device, and wherein the further data items received in the portable operating device or in the decentralized process device are combined with the data items related exclusively to the same state of the portable operating device and the decentralized process device.

13. The system as claimed in claim 12, wherein the data items related exclusively to the same state of the portable operating device and the decentralized process device include at least one display characteristic for information to be displayed, and wherein the display characteristic include a display mask or a screen layout.

* * * * *

UNITED STATES PATENT AND TRADEMARK OFFICE
CERTIFICATE OF CORRECTION

PATENT NO. : 8,433,825 B2  
APPLICATION NO. : 12/227275  
DATED : April 30, 2013  
INVENTOR(S) : Stefan Gross Page 1 of 1

It is certified that error appears in the above-identified patent and that said Letters Patent is hereby corrected as shown below:

In the Claims:

In claim 1, col. 4, lines 37-38, please delete "field device" and insert --decentralized process device--.

In claim 11, col. 5, line 24, please delete "industrial plant is linked" and insert --industrial plant and is linked--.

Signed and Sealed this  
Thirtieth Day of July, 2013

Teresa Stanek Rea  
*Acting Director of the United States Patent and Trademark Office*